United States Patent [19]

Arai

[11] Patent Number: 4,693,835

[45] Date of Patent: Sep. 15, 1987

[54] FILTER PROCESS AND ITS DEVICE

[75] Inventor: Koichi Arai, Kanagawa, Japan

[73] Assignee: Arai Machinery Corporation, Japan

[21] Appl. No.: 767,746

[22] Filed: Aug. 21, 1985

Related U.S. Application Data

[63] Continuation of Ser. No. 638,660, Aug. 7, 1984, abandoned.

[51] Int. Cl.⁴ .............................................. B01D 29/48
[52] U.S. Cl. .................................. 210/777; 210/193; 210/460; 210/461; 210/497.1
[58] Field of Search ................ 75/66, 93 R; 266/227; 210/777, 778, 193, 460, 461, 497.1

[56] References Cited

U.S. PATENT DOCUMENTS

| | | | |
|---|---|---|---|
| 1,943,307 | 1/1934 | Gilbert | 266/227 |
| 2,616,846 | 11/1952 | Carter | 210/497.1 |
| 2,677,466 | 5/1954 | Lowe | 210/497.1 |
| 2,699,260 | 1/1955 | Komline | 210/497.1 |
| 3,221,819 | 12/1965 | Dickinson | 210/497.1 |
| 3,469,057 | 9/1969 | Maines | 210/777 |
| 3,869,282 | 3/1975 | Curran | 266/227 |
| 3,937,281 | 2/1976 | Harnsberger | 210/460 |
| 4,276,265 | 6/1981 | Gillespie | 210/497.1 |
| 4,299,283 | 11/1981 | Gryskiewicz | 210/497.1 |
| 4,388,197 | 6/1983 | Lumikko | 210/777 |
| 4,415,613 | 11/1983 | Medney | 210/497.1 |
| 4,421,646 | 12/1983 | Correge | 210/497.1 |
| 4,428,423 | 1/1984 | Koehler | 210/497.1 |

OTHER PUBLICATIONS

Cochrane, "Condensate Scavenger Filters Hi-Domatic Type," Philadelphia, Pa., Sep. 17, 1963.

Primary Examiner—Ernest G. Therkorn
Attorney, Agent, or Firm—Louis E. Marn

[57] ABSTRACT

A filter process and its device consist of a double filtration system, i.e. a superficial filtration by means of coating of a filter medium and a cubical filtration by forming a large number of recesses between adjacent wires to be wrapped up round a screw thread portion of a cylinder. The screw thread portion is formed on the outer circumference of the cylinder. The section of the wire is isosceles triangle and a summit of the wire is wrapped up round screw bottom of the screw thread portion.

2 Claims, 13 Drawing Figures

FILTER PROCESS AND ITS DEVICE

This is a continuation of application Ser. No. 638,660, filed Aug. 7, 1984, now abandoned.

BACKGROUND OF THE INVENTION (1) Field of the Invention

This invention relates to a filter process and its device which consist of a superficial filtration by means of coating of a filter medium and a cubical filtration by use of an isosceles triangular wire.

(2) Description of the Prior Art

Generally, the term "filter" means to remove suspended impurities by passing liquid through any substance such as cloth, paper, porous porcelain or the like. It is required to increase a filtering degree in combination of a filtering paper or a network with a porous sintered metal or a fiber. In order to carry out more accurate filtration, e.g. a filter process as shown in FIG. 1 has been introduced conventionally.

A filter device A for superficial filtration comprises a cylinder body 1, a screw thread portion 2 on its outer circumference and a plurality of pores 3 perforated in a zigzag form on the outer circumference. The plurality of pores 3 are communicated with a cavity 1a of the cylinder 1. Numeral 4 is an approximately isosceles triangular wire having a base 4a, a base surface 4b and a vertical angle $\alpha$.

The wire 4 is wrapped up round a screw bottom 2b in such a manner that the length of the base 4a of the wire 4 is slightly smaller than a pitch P between adjacent screw crests 2a, and the vertical angle $\alpha$ of the wire 4 is identical with an angle $\alpha$ between adjacent screw threads. Then, a slit S is formed between adjacent wires 4, 4 and a filter element E is formed, through which a liquid Li containing impurities passes as shown by arrows, and a purified liquid Lo is produced. A width w of the slit S is obtained by deducting the length of the base 4a from the pitch P.

However, one disadvantage of such conventional filter method is that it is not always possible to pass some solid impurities through the filter element E because the slit S is a lengthy gap. Another disadvantage thereof is that some liquid impurities may pass through the filter element E since its passing area is large. A further disadvantage thereof is that some screw summits 2a or some screw bottom 2b may be deformed at an edge 3a where a direction of the screw thread 2 contacts an edge of each pore 3. Accordingly, the wire 4 is not always uniformly wrapped up above the plurality of pores 3, thereby the width w of the slit S may be irregular.

In FIG. 2 there is shown another conventional filter device B, in which numeral 5 is a porous stainless steel plate of 5 mm$\phi$ as the lowest layer, numeral 6 is a filter paper 6 disposed thereupon and numeral 7 is a resinous layer precoated on the filter paper 6. Thus, liquid impurities can be removed one after another by the resinous layer 7, the filter paper 6 and the porous stainless steel plate 5 respectively. However, most of the impurities are filtered by the resinous layer 7 and each pore of the filter paper 6 and the porous stainless steel 5 is small in diameter. Therefore, the filter paper 6 and the porous stainless steel plate 5 are susceptible of clogging, so that the durability of the filter device B is short-range. In addition, it is not available to use a scraper to prevent clogging and to carry out back-flow cleaning. Further, if the resinous layer 7 is made of powdered resins, it is difficult to recycle it, so that it will be thrown away by one time use.

The task of this invention is to remove the aforementioned disadvantages of the conventional art.

BRIEF SUMMARY OF THE INVENTION

According to one aspect of this invention, a filter process comprises the following steps: forming a screw thread portion on the outer circumference of a cylinder having a plurality of passages communicated with a cavity of said cylinder; wrapping up a summit of an isosceles triangular wire round screw bottoms of said screw thread portion and approximately flattening said screw thread portion; forming a recess of preferred profile between adjacent wires by cutting off respective bottom corners of said adjacent wires; coating a filter medium of fine particles on a base of each wire and in above said recess and forming a multilayer of the filter medium; and carrying out a filter operation by passing a liquid through said multilayer.

According to another aspect of this invention, a filter apparatus comprises the following steps: a cylinder having a plurality of longitudinal passages spaced with each other and formed along the outer periphery of said cylinder, and a plurality of lateral paths communicated with said plurality of longitudinal passages and a cavity of said cylinder; a screw thread portion formed on said outer periphery of said cylinder; a wire of isosceles triangular in section to be wrapped up round screw bottoms of said screw thread portion by inserting a summit of said wire in said screw bottoms; and a recess of preferred profile formed between adjacent wires by cutting off respective corners of said adjacent wires.

Other objects and advantages of this invention will become apparent during the following discussion of the accompanying drawings.

BRIEF DESCRIPTION OF THE ACCOMPANYING DRAWINGS

PREFFERED EXAMPLE OF THE INVENTION

A preferred example of the invention will be described with reference to FIGS. 3 to 7.

Figure 1A:
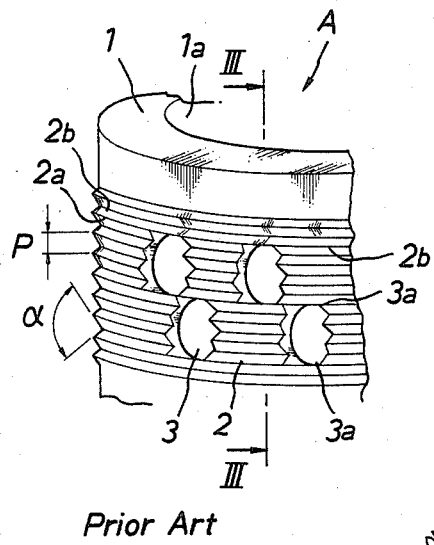
FIG. 1A is a partial perspective view of a conventional filter device.
Figure 1B:
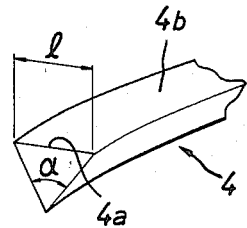
FIG. 1B is a partial perspective view of a wire which is to be wound up on a screw thread portion of the filter device in FIG. 1.
Figure 1C:
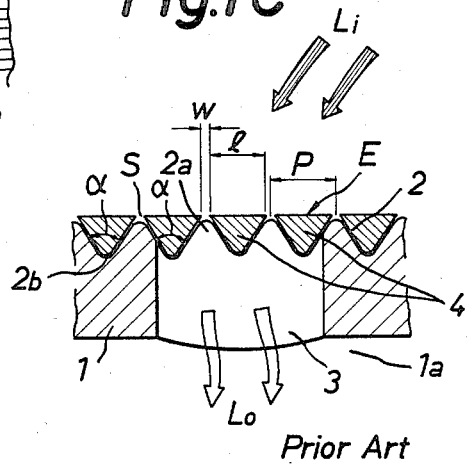
FIG. 1C is an expanded section view taken on line III—III of the filter device in FIG. 1, in which the wire is wound up on the screw thread portion.
Figure 2:
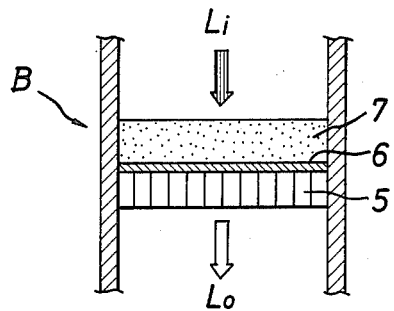
FIG. 2 is a section view of another conventional filter device.
Figure 3:
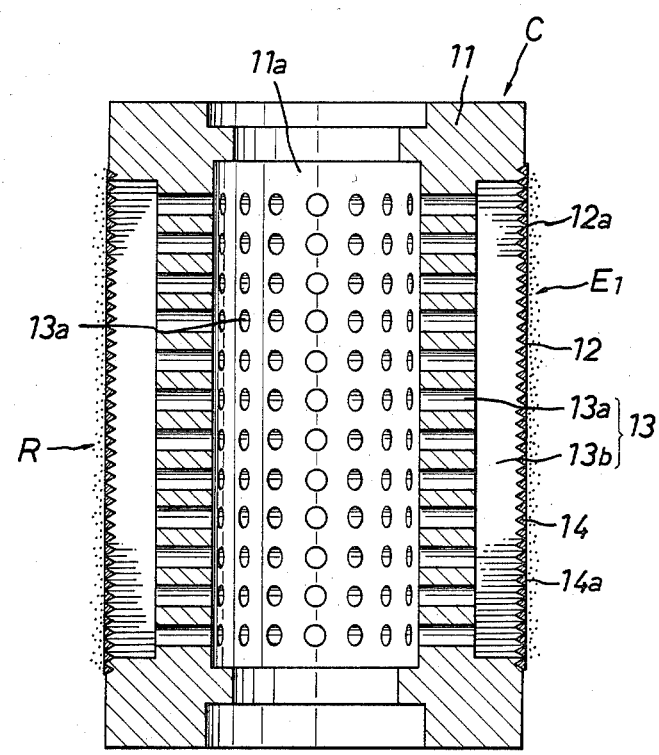
FIG. 3 is a vertical section view of an example of a filter device according to this invention.

In FIG. 3 there is shown a filter device C according to this invention. The filter device C comprises a cylinder body 11, a screw thread portion 12 on its outer circumference, a plurality of longitudinal passages 13b formed on the outer circumference and spaced with each other, a plurality of lateral paths 13a spaced with each other and communicated with a cavity 11a and the plurality of longitudinal passages 13b.

Figure 4A:
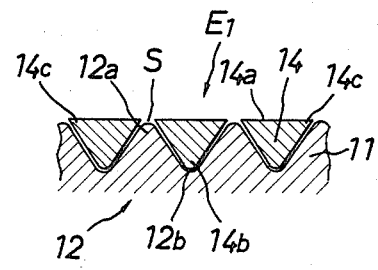
FIG. 4A is a section view of a wire of which corner is not yet cut off.
Figure 4B:
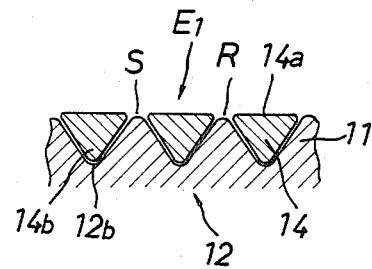
FIG. 4B is a section view of a wire of which corner is already cut off for practical use.

Numeral 14 is a metal wire of which material is the same as that of the cylinder body 11. As shown in FIGS. 4A and 4B, the section of the wire 14 is isosceles triangle. The wire 14 having a base 14a and a summit 14b is wrapped up round respective screw bottoms 12b of the screw thread portion 12 in such a manner that the summit 14b of the wire 14 is fit in the screw bottom 12b of the screw thread portion 12, and a base portion of the wire 14 forms a nearly flattened surface of the cylinder 11. Then, a slit S is formed spirally between adjacent wires 14, and a filter element $E_1$ is formed. Symbol R showns a recess between adjacent wires 14.

Figure 5A:
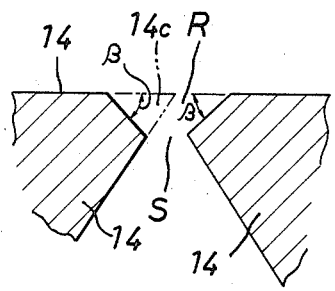
FIGS. 5A, 5B, 5C and 5D are modifications of the wires having various sectional profiles as well as the recesses formed between adjacent wires.
Figure 5B:
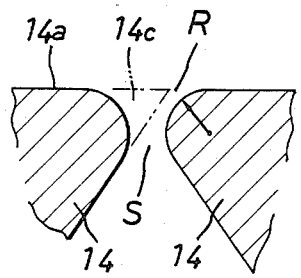
Figure 5C:
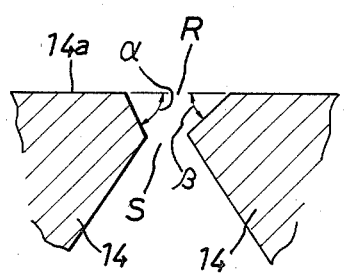
Figure 5D:
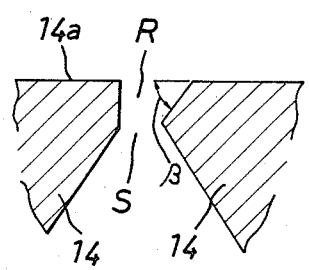

FIGS. 5A to 5D show respective modifications of the recess R, wherein each profile of the wire 14 is predetermined before mounting it in the screw bottom 12b. For example, in FIG. 5A a corner 14c of the wire 14 is cut off with an acute angle $\beta$. In FIG. 5B the corner 14c is curved. In FIG. 5C one corner of the wire 14 is cut off with a different angle $\alpha$. In FIG. 5D one end of the wire 14 is cut off at a right angle relative to the bottom 14a line, while the other end thereof is cut off with the angle $\beta$. Preferably, the material of the cylinder 11 is the same as that of the wire 14. For example, it may be made of the same kind of stainless steel or titanium in order to prevent imbalance of the width w of the slit S or disengagement between the wire 14 and the screw threads that may be caused by thermal expansion.

Figure 6:
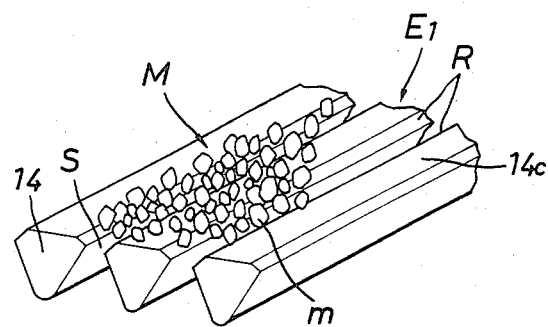
FIG. 6 is a view of the condition in which particles of a filter medium are adhered to the recesses.

A filter process of this invention will be described with reference to FIGS. 6 and 7.

Prior to the filter process, a filter medium M of fine particles is coated on the surface of the filter element $E_1$, thereby the particles are formed as a layer m in the recess R.

The filter medium M may be made of the following materials.

(1) Organic substance of starch particles coated with resin.
(2) Particles obtained by pulverizing a hydrophilic and repellent fiber matrix.
(3) Diatomaceous earth particles
(4) Ceramic particles such as alumina particles
(5) Lipophilic and hydrophobic fiber
(6) Stainless steel particles or the like
(7) Chaff charcoal or coconut husk charcoal Under such circumstances, when a liquid Li containing impurities is fed into the filter element $E_1$, the impurites contained in the liquid Li are filtered by the layer m and then the slits S, thereby a purified liquid Lo is supplied into the cavity 11a by way of the longitudinal passages 13b and lateral paths 13a.

In order to increase the filter capacity further, it is desirable to coat the filter medium M in a crosswise or spiral form. Further, when the filter element $E_1$ is clogged with the impurities, it is desirable to mount a scraper outside the filter element $E_1$ and actuate it intermittently. Alternatively, it is optional to remove clogging with the impurities by providing ultrasonic vibration while rotating the filter device C or by means of back-flow cleaning.

As described above, the process of this invention includes a first filtration by means of coating of a filter medium and a second filtration by forming a large number of recesses between adjacent wires to be wrapped up round screw bottoms. In other words, the present process consists of a double filtration system, i.e. a superficial filtration and a cubical filtration, thereby the filtering accuracy is enhanced greatly. For example, whereas the width w of the slit S is 10μ, a gap between adjacent particles as the filter medium becomes 1μ. Further, although the filtering area of the slits is narrowed, the coating area is wide, so that the filtering area is enlarged remarkably.

Figure 7:
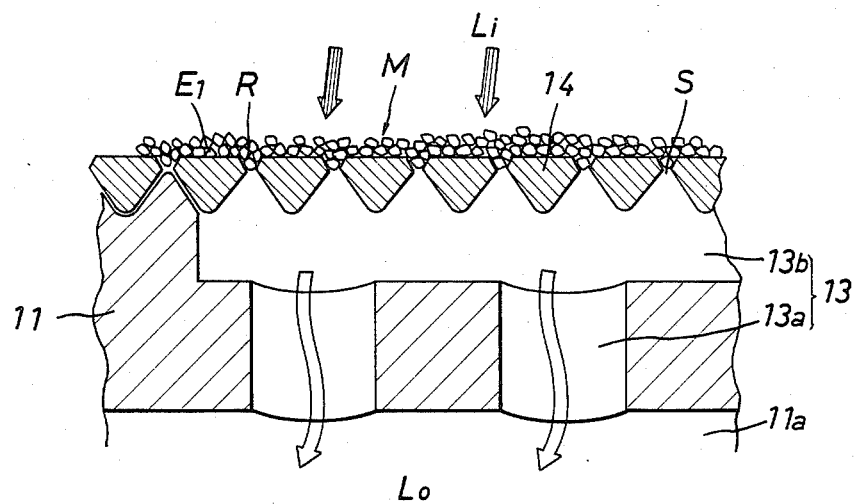
FIG. 7 is a section view of the wire which is wrapped up on one longitudinal passage formed along the outer circumference of a cylinder, and shows a filtration process according to this invention.

Further, since the filter medium particles m are multi-layered as shown in FIG. 7, the slit is never opened even if they are slided along the slit S.

As many apparently widely different examples of this invention may be made without departing from the spirit and scope thereof, it is to be understood that the invention is not limited to the specific examples thereof except as defined in the appended claims.

What is claimed is:

1. A filter process comprising:
    forming a screw thread portion about an outer circumference of a cylinder, said cylinder having a plurality of passages longitudinally-formed about said cylinder and communication with an internal cavity in said cylinder;
    wrapping an isosceles triangularly-shaped wire about said screw thread portion thereby forming an essentially flat surface comprises of base surfaces of said wire, said triangularly-shaped wire having excised corner portion on said base surface thereby forming a recess to a slit formed between adjacent wires coinciding with said longitudinally-formed passages, said slit being of a width less than a width of said recess leading to said slit;
    coating a filter medium of fine particles on said wire in and about said recess to thereby form a layer of filter medium; and
    carrying out a filter operation by passing a liquid through said layer of filter medium and thence through said slit from said recess of said wire.

2. A filter device comprising:
    a cylinder having a plurality of longitudinally-formed passages and laterally-disposed channels, said longitudinally-formed passages being spaced apart from each other and formed about an outer periphery of said cylinder, said plurality of laterally-disposed channels providing communication between said longitudinally-formed passages and an internal cavity of said cylinder;
    a screw threaded portion including a screw bottom formed on said outer periphery of said cylinder; and
    a wire of an isosceles-shaped triangle in section wrapped about said screw threaded portion by positioning a summit of said wire in said screw bottom, said wire formed with excised corner portions on a base surface thereof thereby forming an essentially flat surface conprised of base surfaces of said wire and forming a recess to a slit between adjacent wires coinciding with said longitudinally-formed passages, said slit being of a width less than a width of said recess leading to said slit.

* * * * *